(12) United States Patent  
Ou

(10) Patent No.: US 8,892,812 B2  
(45) Date of Patent: Nov. 18, 2014

(54) FLASH MEMORY DEVICE AND DATA WRITING METHOD FOR A FLASH MEMORY

(75) Inventor: Hsu-Ping Ou, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 193 days.

(21) Appl. No.: 13/424,758

(22) Filed: Mar. 20, 2012

(65) Prior Publication Data

US 2012/0246394 A1    Sep. 27, 2012

(30) Foreign Application Priority Data

Mar. 21, 2011 (TW) .............................. 100109497 A

(51) Int. Cl.  
G06F 12/00 (2006.01)  
G06F 12/02 (2006.01)  
G06F 11/30 (2006.01)

(52) U.S. Cl.  
CPC ........ G06F 12/0246 (2013.01); G06F 11/3034 (2013.01); G06F 11/3037 (2013.01); G06F 11/3082 (2013.01)  
USPC ............ 711/103; 711/156; 711/170; 711/173

(58) Field of Classification Search  
None  
See application file for complete search history.

(56) References Cited

U.S. PATENT DOCUMENTS

2009/0287875 A1* 11/2009 Lin ............................... 711/103  
2010/0070688 A1* 3/2010 Lin ............................... 711/103

FOREIGN PATENT DOCUMENTS

TW    200947201 A    11/2009  
TW    201013406 A    4/2010

OTHER PUBLICATIONS

Office Action of corresponding TW application, published on Nov. 12, 2013.

* cited by examiner

Primary Examiner — Shawn X Gu  
(74) Attorney, Agent, or Firm — Wang Law Firm, Inc.; Li K. Wang; Stephen Hsu

(57) ABSTRACT

A data writing method for a flash memory. First, a plurality of blocks of a flash memory is classified into a plurality of block groups according to the erase counts of the blocks. A logical address range of a host is then divided into a plurality of logical address sections respectively corresponding to the block groups. Write data is then received from the host. A target logical address section to which the logical address of the write data belongs is then determined. A target block group corresponding to the target logical address section is then determined. A target block is then selected from the blocks of the target block group. The write data is then written to the target block.

17 Claims, 8 Drawing Sheets

FLASH MEMORY DEVICE AND DATA WRITING METHOD FOR A FLASH MEMORY

CROSS REFERENCE TO RELATED APPLICATIONS

This application claims the benefit of Taiwan Patent Application No. 100109497, filed on Mar. 21, 2011, the entirety of which is incorporated by reference herein.

BACKGROUND OF THE INVENTION

1. Field of the Invention

The invention relates to memories, and more particularly to flash memories.

2. Description of the Related Art

A flash memory comprises a plurality of blocks for data storage. A frequency for erasing or programming a block is referred to as an erase count or a write count of the block. A controller of a flash memory records the erase counts of all blocks of the flash memory in an erase count table. A frequency for reading a block is referred to as a read count of the block. When a block is used with a high frequency, the erase count and the read count of the block is also high.

When a block stores data with a high used frequency, the block has a high erase count and a high read count and is easily damaged. New data cannot be written to a damaged block. In addition, if data has been stored in a damaged block, when the data is read out from the damaged block, the read-out data has a high bit error rate. Referring to FIG. 2A, a schematic diagram of a relationship between an erase count and a data error rate of a block is shown. When a block has a high erase count, the block also has a high data error rate. Referring to FIG. 2B, a schematic diagram of a relationship between a read count and a data error rate of a block is shown. When a block has a high read count, the block also has a high data error rate. Referring to FIG. 2C, a schematic diagram of a relationship between an erase count and a data retention period of a block is shown. A block with a high erase count has a short data retention period, and a block with a low erase count has a long data retention period.

To prevent a block with a high erase count from damage, a controller of a flash memory performs a wear-leveling process to equally use all blocks of the flash memory. Referring to FIG. 1, a schematic diagram of a distribution of erase counts of all blocks of a flash memory is shown. The blocks of the flash memory have different physical block addresses. After a wear-leveling process is performed, the blocks with different physical block addresses have the same erase counts. Thus, the situation where a single block has a high erase count and is easily damaged is avoided.

The importance of data stored in the flash memory, however, is different. For example, system data such as a partition table and a root directory has a high importance. When a controller performs a wear-leveling process, data with high importance may be written to a block with a high erase count. If the data with high importance is damaged due to the high erase count of the block, errors may occur in the operation of the system. For example, when a partition table is detected, all data stored in the flash memory cannot be read from the flash memory according to the partition table. When a root directory is defective, the data stored in the directory with errors also cannot be read out. Thus, a data writing method for a flash memory is required to prevent the aforementioned defects.

BRIEF SUMMARY OF THE INVENTION

The invention provides a data writing method for a flash memory. First, a plurality of blocks of a flash memory is classified into a plurality of block groups according to the erase counts of the blocks. A logical address range of a host is then divided into a plurality of logical address sections respectively corresponding to the block groups. Write data is then received from the host. A target logical address section to which the logical address of the write data belongs is then determined. A target block group corresponding to the target logical address section is then determined. A target block is then selected from the blocks of the target block group. The write data is then written to the target block.

The invention provides a flash memory device. In one embodiment, the flash memory device is coupled to a host, and comprises a flash memory and a controller. The flash memory comprises a plurality of blocks which are classified into a plurality of block groups according erase counts of the blocks. The controller receives write data from the host, determines the importance of the write data, selects a target block group from the block groups according to the importance of the write data, selects a target block from the blocks of the target block group, and writes the write data to the target block.

The invention provides a flash memory device. In one embodiment, the flash memory device is coupled to a host, and comprises a flash memory and a controller. The flash memory comprises a plurality of blocks, wherein the blocks are classified into a plurality of block groups according to the erase counts of the blocks, and the block groups respectively correspond to a plurality of logical address sections of a logical address range of the host. The controller receives write data from the host, determines a target logical address section to which the logical address of the write data belongs, determines a target block group corresponding to the target logical address section, selects a target block from the blocks of the target block group, and writes the write data to the target block.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
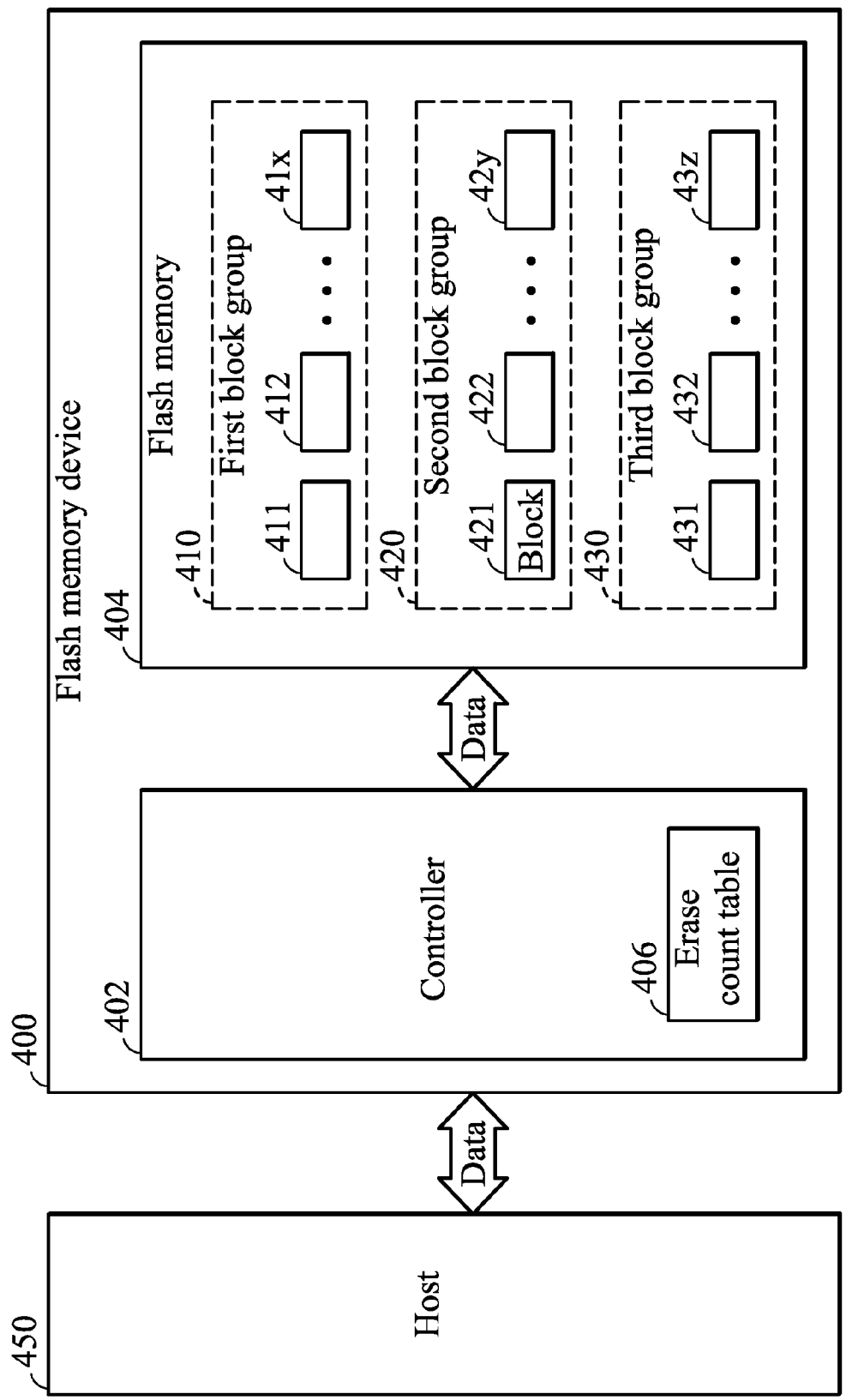
FIG. 4 is a block diagram of a flash memory device according to the invention.

Referring to FIG. 4, a block diagram of a flash memory device 400 according to the invention is shown. The flash memory device 400 is coupled to a host 450. In one embodiment, the flash memory device 400 comprises a controller 402 and a flash memory 404. The flash memory 404 comprises a plurality of blocks for data storage. Each block has a corresponding erase count which is the frequency at which the corresponding block is erased. The controller 402 comprises an erase count table 406 for recording the erase counts of the blocks of the flash memory 404. The blocks of the flash memory 404 are classified into a plurality of block groups according to the erase counts of the blocks. Each block group comprises a plurality of blocks, and the number of the blocks of the block groups may be different from each other.

When the controller 402 receives write data from the host 450, the controller 402 must write the write data to the flash memory 404. The controller 402 first determines the importance of the write data, and selects a target block group from the block groups of the flash memory 404. The controller 402 then selects a target block from the target block group, and then writes the write data to the target block. In one embodiment, the blocks of the flash memory 404 are divided into a first block group with high erase counts and second block group with a low erase counts. When the controller 402 determines the write data to be system data with high importance, because system data has a low tolerance for data errors, the controller 402 selects the second block group with a low erase count as the target block group for storing the write data to ensure the correctness of the system data. When the controller 402 determines the write data to be user data with low importance, because user data has a high tolerance for data errors, the controller 402 selects the first block group with a high erase count as the target block group for storing the write data.

Figure 1:
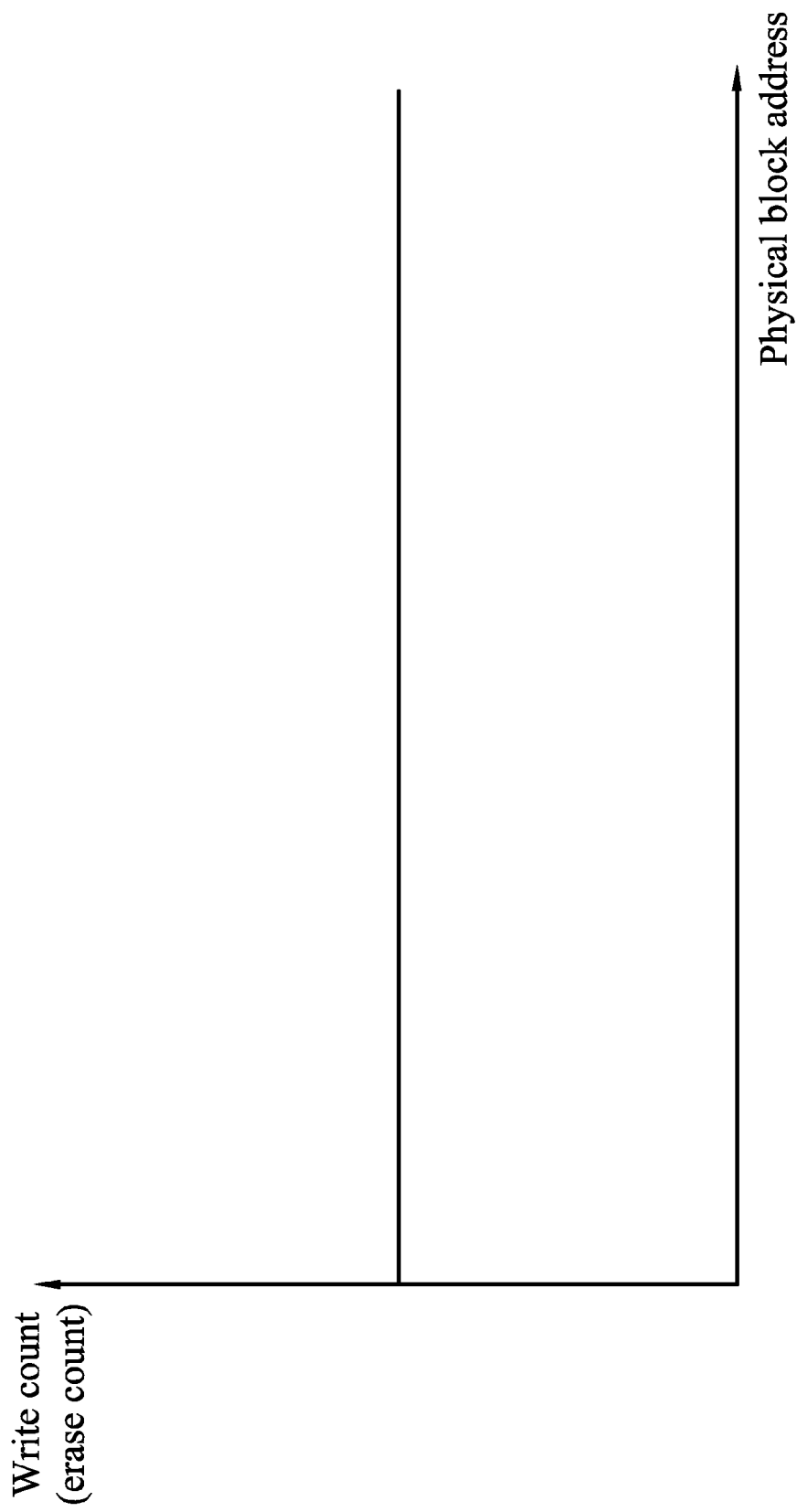
FIG. 1 is a schematic diagram of a distribution of erase counts of all blocks of a flash memory.
Figure 2A:
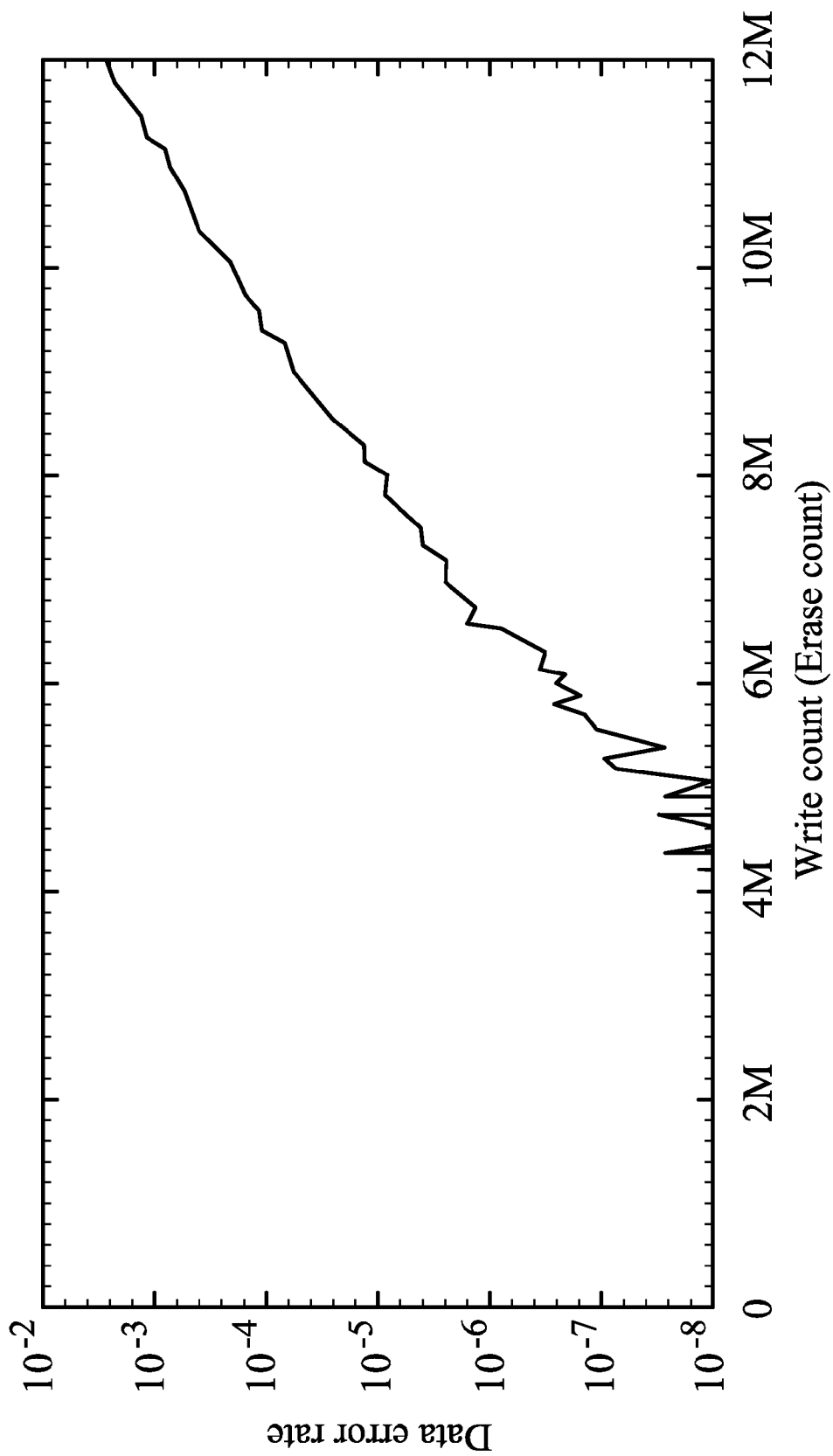
FIG. 2A is a schematic diagram of a relationship between an erase count and a data error rate of a block.
Figure 2B:
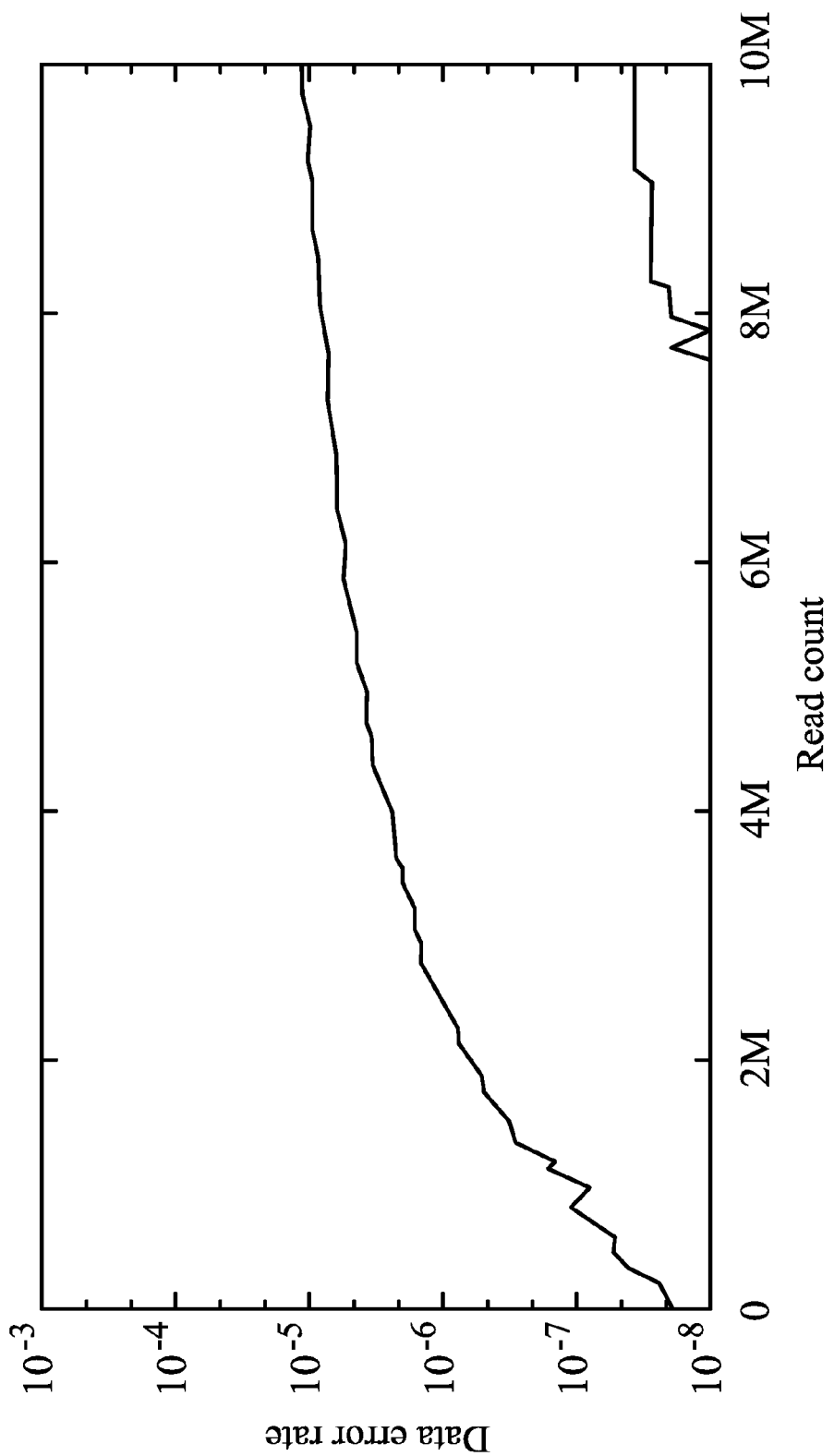
FIG. 2B is a schematic diagram of a relationship between a read count and a data error rate of a block.
Figure 2C:
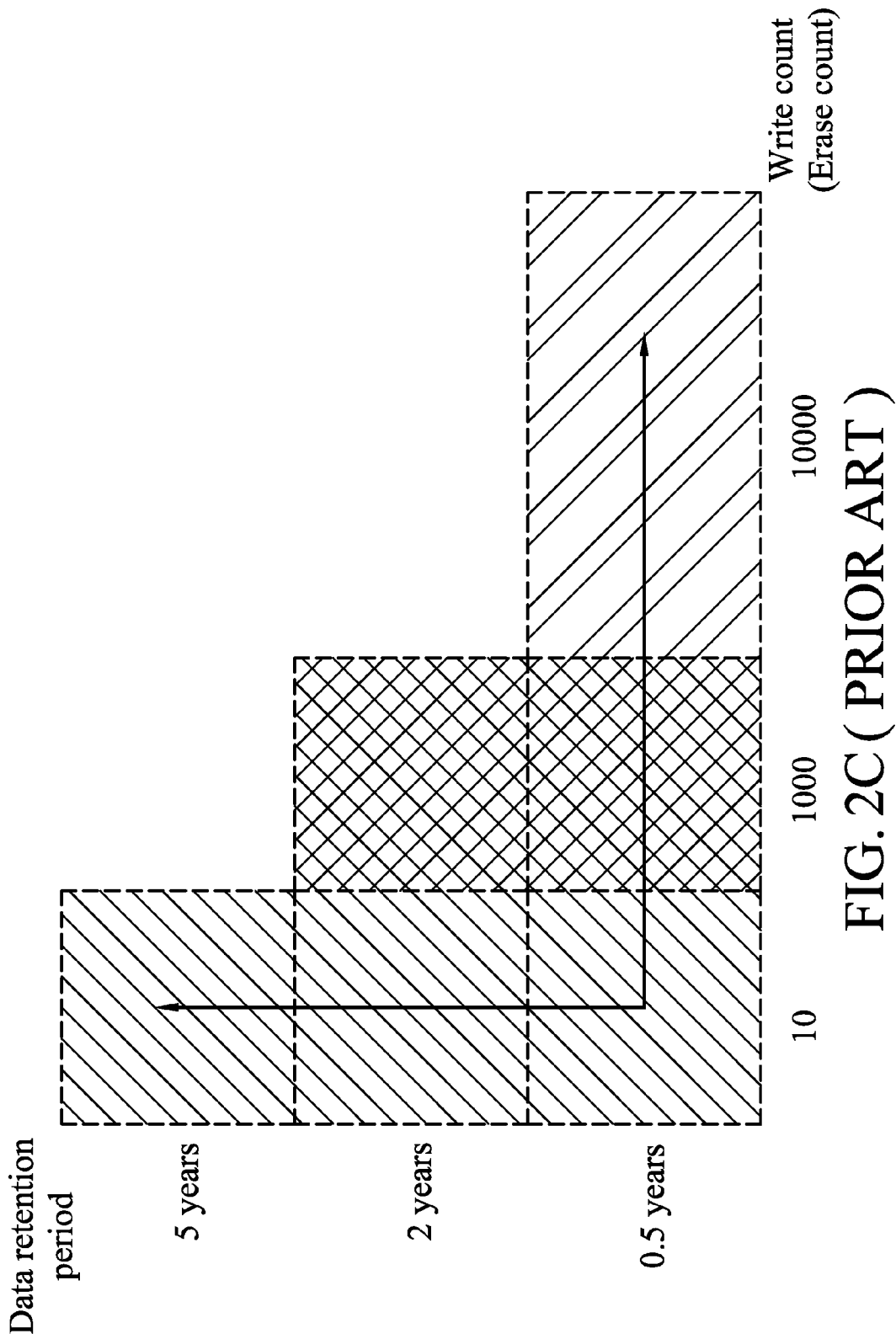
FIG. 2C is a schematic diagram of a relationship between an erase count and a data retention period of a block.
Figure 3:
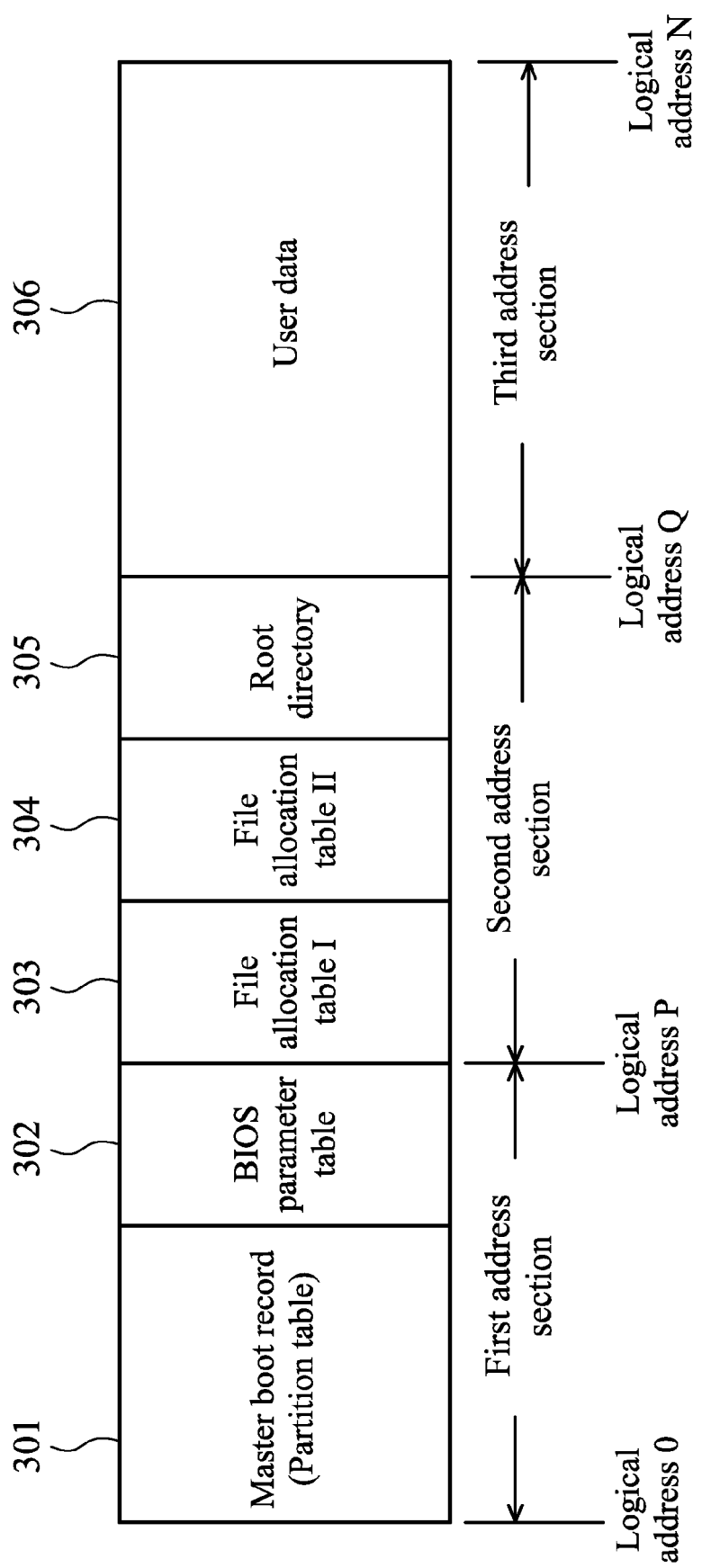
FIG. 3 is a schematic diagram of distribution of logical addresses of a host according to the invention.

In one embodiment, the controller 402 determines the importance of the write data according to the logical address of the write data. Referring to FIG. 3, a schematic diagram of distribution of logical addresses of a host according to the invention is shown. The data stored by the host 450 in the flash memory 404 comprises a master boot record and a partition table 301, a BIOS parameter table 302, file allocation tables 303 and 304, a root directory 305, and user data 306. The master boot record 301 is stored in the start of the logical address. The BIOS parameter table 302, the first file allocation table 303, the second file allocation table 304, the root directory 305, and user data 306 are then sequentially stored according to the logical addresses. The importance of the stored data is decreased with increase of the logical address of the stored data.

In one embodiment, the address range of the flash memory 404 used by the host 450 is divided into three address sections. The first address section is between a logical address 0 and a logical address P and is used to store the master boot record 301 and the BIOS parameter table 302. The second address section is between the logical address P and a logical address Q and is used to store the file allocation tables 303 and 304 and the root directory 305. The third address section is between the logical address Q and a logical address N and is used to store the user data 306.

For example, if the file system of the host is the FAT 16 system, the value of the logical address P may be 63~8192, and the value of the logical address Q may be $P+2^{10}$. If the file system of the host is the FAT 32 system, the value of the logical address P may be 63~8192, and the value of the logical address Q may be $P+2^{21}$. Data stored in the first address section has high importance, data stored in the second address section has medium importance, and data stored in the third address section has low importance. The controller 402 can therefore determine the importance of write data according to whether the logical address of the write data falls in the first address section, the second address section, or the third address section. The controller 402 can then find a target block group with erase counts corresponding to the importance of the write data. For example, the blocks of the flash memory 404 are divided into a first block group 410 with a low erase count, a second block group 420 with a medium erase count, and a third block group 430 with a high erase count. Because the lengths of the first address section, the second address section, and the third address section are different from each other, the number of the blocks comprised by the first block group 410, the second block group 420, and the third block group 430 are also different from each other.

Figure 5:
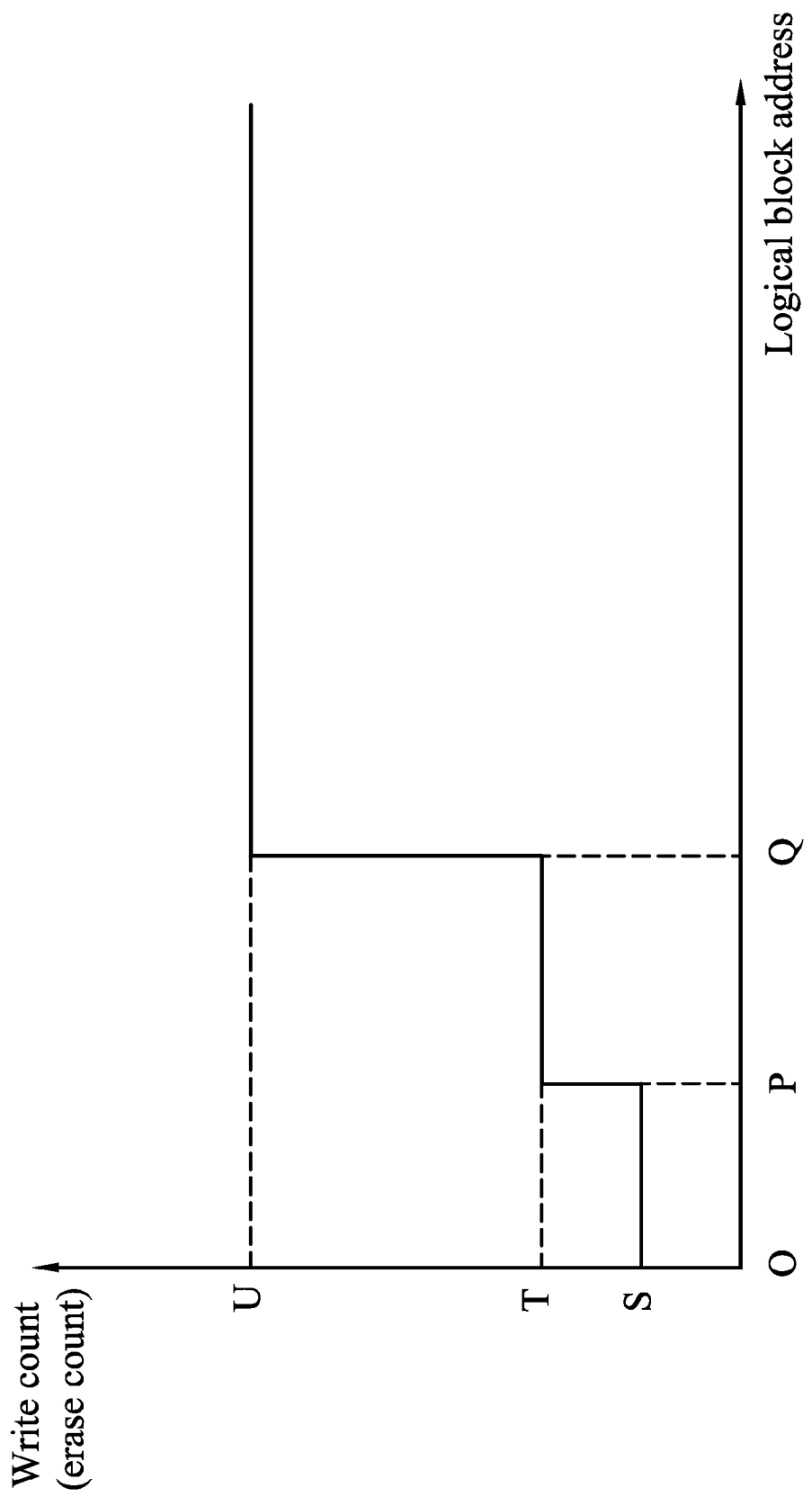
FIG. 5 is a schematic diagram of a corresponding relationship between logical block addresses and erase counts of a flash memory according to the invention.

Referring to FIG. 5, a schematic diagram of a corresponding relationship between logical block addresses and erase counts of a flash memory according to the invention is shown. Because the logical address section 0~P corresponds to data with high importance, the blocks of the first block group 410 have logical addresses corresponding to the logical address section 0~P and have a low erase count S. Because the logical address section P~Q corresponds to data with medium importance, the blocks of the second block group 420 have logical addresses corresponding to the logical address section P~Q and have a medium erase count T. Because the logical address section Q+ corresponds to data with high importance, the blocks of the third block group 430 have logical addresses corresponding to the logical address section Q+ and have a high erase count U. In one embodiment, the ratio of erase counts S, T, and U is 1:10:100. For example, when S is equal to 50, T is equal to 500, and U is equal to 5000. In one embodiment, the erase counts of the first block group 410, the second block group 420, and the third block group 430 have different erase count ranges. When a specific block of a specific block group selected from the block groups 410, 420, and 430 has an erase count greater than the erase count threshold of the specific block group, the controller 402 moves the specific block from the specific block group to another appropriate block group with an appropriate erase count range. In one embodiment, the controller respectively performs a wear-leveling process on each of the block groups 410, 420, and 430. For example, the controller 410 performs a first wear-leveling process on the blocks 411~41x, a second wear-leveling process on the blocks 421~42y, and a third wear-leveling process on the blocks 431~43z.

Figure 6:
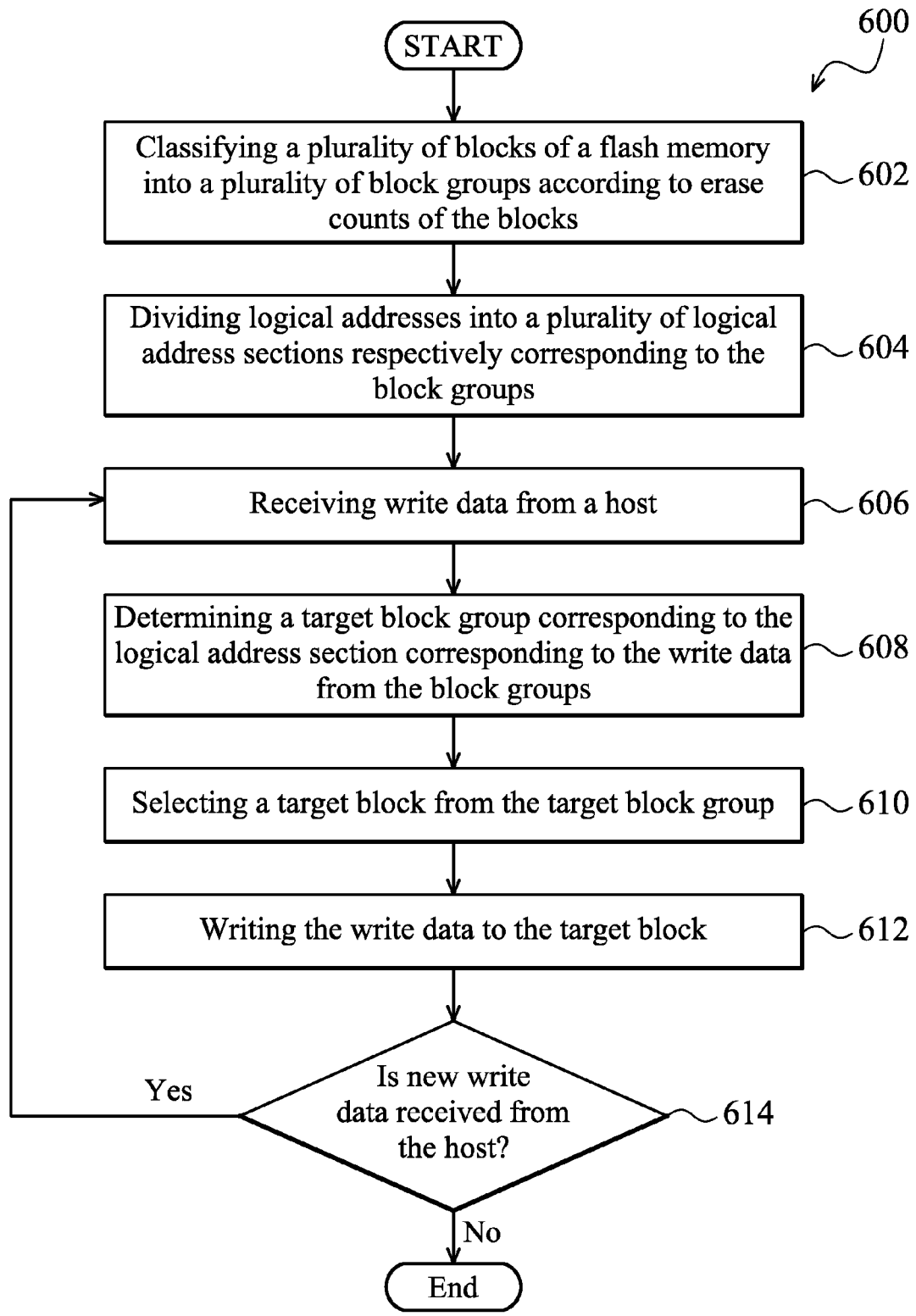
FIG. 6 is a flowchart of a data writing method for a flash memory according to the invention.

Referring to FIG. 6, a flowchart of a data writing method 600 for a flash memory according to the invention is shown. First, the controller 402 classifies a plurality of blocks of a flash memory 404 into a plurality of block groups 410, 420, and 530 according to erase counts of the blocks (step 602). The controller 402 then divides logical addresses used by the host 450 into a plurality of logical address sections respectively corresponding to the block groups 410, 420, and 430 (step 604). In one embodiment, the logical address section with high data importance corresponds to the block group with a low erase count, and the logical address section with low data importance corresponds to the block group with a high erase count. The controller 402 then receives write data from a host 450 (step 606). The controller 402 then determines a target block group corresponding to the logical address section corresponding to the write data from the block groups 410, 420, and 430 (step 608). The controller 402 then selects a target block from the target block group (step 610), and then writes the write data to the target block (step 612). Finally, if the controller 402 receives new write data from the host 450, the controller 402 repeats the steps 606~612 to write the new write data to the flash memory 404. The controller 402 therefore writes data to a block with an erase count corresponding to the importance of the data, and correctness of the data stored in the block is thereby assured.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data writing method for a flash memory, comprising:
    classifying a plurality of blocks of the flash memory into a plurality of block groups according to erase counts of the blocks;
    dividing a logical address range of a host into a plurality of logical address sections respectively corresponding to the block groups;
    receiving write data from the host;
    determining a target logical address section to which a logical address of the write data belongs;
    determining a target block group corresponding to the target logical address section;
    selecting a target block from blocks of the target block group; and
    writing the write data to the target block, wherein the logical address sections are sorted according to data importance, wherein logical address sections with high data importance correspond to block groups with low erase counts, and logical address sections with low data importance correspond to block groups with high erase counts.

2. The data writing method as claimed in claim 1, wherein the logical address sections comprise a first address section and a second address section, the first address section is used to store system data, and the second address section is used to store user data.

3. The data writing method as claimed in claim 2, wherein the block groups comprise a first block group with a low erase count and a second address group with a high erase count, the first block group corresponds to the first address section, and the second block group corresponds to the second address section.

4. The data writing method as claimed in claim 1, wherein the logical address sections comprise a first address section, a second address section, and a third address section, the first address section is used to store a master boot record and a basic input/output system (BIOS) parameter block, the second address section is used to store a file allocation table and a root directory, and the third address section is used to store user data.

5. The data writing method as claimed in claim 4, wherein the block groups comprise a first block group with a low erase count, a second block group with a medium erase count, and a third block group with a high erase count, and the first block group corresponds to the first address section, the second block group corresponds to the second address section, and the third block group corresponds to the third address section.

6. The data writing method as claimed in claim 1, wherein the data writing method further comprises:
    when a wear-leveling process is performed on the blocks of the flash memory, the wear-leveling process is only performed on blocks of each of the block groups.

7. The data writing method as claimed in claim 1, wherein the data writing method further comprises:
    when a erase count of a specific block of a specific block group selected from the block groups is greater than an erase count threshold of the specific block group, and the specific block is moved from the specific block group to another block group with an appropriate erase count threshold greater than the erase count of the specific block.

8. The data writing method as claimed in claim 1, wherein lengths of the logical address sections are different from each other, and numbers of blocks of the block groups are also different from each other.

9. A flash memory device, coupled to a host, comprising:
    a flash memory, comprising a plurality of blocks which are classified into a plurality of block groups according erase counts of the blocks; and
    a controller, receiving write data from the host, determining importance of the write data, selecting a target block group from the block groups according to the importance of the write data, selecting a target block from blocks of the target block group, and writing the write data to the target block, wherein the controller determines whether the write data is system data with high importance or user data with low importance, selects a block group with a low erase count as the target block group when the write data is the system data, and selects a block group with a high erase count as the target block group when the write data is the user data, and the controller determines whether the write data is a partition table and a BIOS parameter block with high importance, a file allocation table and a root directory with medium importance, or user data with low importance, selects a block group with a low erase count as the target block group when the write data is the partition table and the BIOS parameter block, selects a block croup with a medium erase count as the target block croup when the write data is the file allocation table and the root directory, and selects a block group with a high erase count as the target block group when the write data is the user data with low importance.

10. The flash memory device as claimed in claim 9, wherein the controller determines the importance of the write data according to a logical address of the write data.

11. A flash memory device, coupled to a host, comprising:
    a flash memory, comprising a plurality of blocks, wherein the blocks are classified into a plurality of block groups according to erase counts of the blocks, and the block groups respectively correspond to a plurality of logical address sections of a logical address range of the host; and
    a controller, receiving write data from the host, determining a target logical address section to which logical address of the write data belongs, determining a target block group corresponding to the target logical address section, selecting a target block from blocks of the target block group, and writing the write data to the target block, wherein the logical address sections are sorted according to data importance, wherein logical address sections with high data importance correspond to block groups with low erase counts, and logical address sections with low data importance correspond to block groups with high erase counts.

12. The flash memory device as claimed in claim 11, wherein the logical address sections comprise a first address section and a second address section, the first address section is used to store system data, and the second address section is used to store user data.

13. The flash memory device as claimed in claim 12, wherein the block groups comprise a first block group with a low erase count and a second block group with a high erase count, the first block group corresponds to the first address section, and the second block group corresponds to the second address section.

14. The flash memory device as claimed in claim 11, wherein the logical address sections comprise a first address section, a second address section, and a third address section, the first address section is used to store a master boot record and a BIOS parameter block, the second address section is used to store a file allocation table and a root directory, and the third address section is used to store user data.

15. The flash memory device as claimed in claim 14, wherein the block groups comprise a first block group with a low erase count, a second block group with a medium erase count, and a third block group with a high erase count, and the first block group corresponds to the first address section, the second block group corresponds to the second address section, and the third block group corresponds to the third address section.

16. The flash memory device as claimed in claim 11, wherein when a wear-leveling process is performed on the blocks of the flash memory, and the controller only performs the wear-leveling process on blocks of each of the block groups.

17. The flash memory device as claimed in claim 11, wherein when an erase count of a specific block of a specific block group selected from the block groups is greater than an erase count threshold of the specific block group, the controller moves the specific block from the specific block group to another block group with an appropriate erase count threshold greater than the erase count of the specific block.

* * * * *